United States Patent
Heyen

(10) Patent No.: US 8,701,536 B2
(45) Date of Patent: Apr. 22, 2014

(54) CIRCULAR SAW BLADE WITH OFFSET GULLETS

(75) Inventor: Andre R. G. Heyen, Bertrange (LU)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 389 days.

(21) Appl. No.: 12/356,712

(22) Filed: Jan. 21, 2009

(65) Prior Publication Data

US 2009/0199692 A1    Aug. 13, 2009

Related U.S. Application Data

(60) Provisional application No. 61/011,805, filed on Jan. 22, 2008.

(51) Int. Cl.
    *B27B 33/14*      (2006.01)
(52) U.S. Cl.
    USPC .................................. 83/835; 83/836; 83/676
(58) Field of Classification Search
    USPC ...................... 83/836–847, 835, 676; 451/542
    See application file for complete search history.

(56) References Cited

U.S. PATENT DOCUMENTS

| | | | |
|---|---|---|---|
| 927,164 A * | 7/1909 | Puffer | 451/450 |
| 1,711,102 A | 4/1929 | Sierra, Jr. | |
| 3,990,338 A * | 11/1976 | Wikner et al. | 83/835 |
| 4,114,494 A | 9/1978 | Budke et al. | |
| 4,135,421 A | 1/1979 | Bertram et al. | |
| 4,222,298 A | 9/1980 | James | |
| 4,224,380 A | 9/1980 | Bovenkirk et al. | |
| 4,232,578 A | 11/1980 | Stellinger et al. | |
| 4,324,163 A | 4/1982 | LaVelle | |
| 4,337,750 A | 7/1982 | Dutcher | |
| 4,516,560 A | 5/1985 | Cruickshank et al. | |
| 4,550,708 A | 11/1985 | Roemmele et al. | |
| 4,578,984 A | 4/1986 | Bohman | |
| 4,583,515 A | 4/1986 | Ballenger | |
| 4,624,237 A * | 11/1986 | Inoue | 125/15 |

(Continued)

FOREIGN PATENT DOCUMENTS

| | | |
|---|---|---|
| DE | 9400182 U1 | 3/1994 |
| EP | 1114696 A1 | 7/2001 |

(Continued)

OTHER PUBLICATIONS

International Search Report dated Apr. 20, 2009, from counterpart International Application No. PCT/US2009/031544, filed on Jan. 21, 2009.

(Continued)

*Primary Examiner* — Omar Flores Sanchez
(74) *Attorney, Agent, or Firm* — Joseph P. Sullivan; Abel Law Group, LLP

(57) ABSTRACT

A saw blade includes a circular core having a plurality of cutting elements along its periphery, and a central arbor hole. One or more offset gullets extend radially inward from the perimeter of the core. Each offset gullet includes a first opening in one side of the core and a second opening in the other side of the core. The first and second openings are adjacent but at least partially offset from one another, so that at least a portion of the offset gullet is not see-through.

20 Claims, 4 Drawing Sheets

(56) References Cited

U.S. PATENT DOCUMENTS

| | | | |
|---|---|---|---|
| 4,690,024 A | 9/1987 | Chaconas | |
| 4,705,017 A | 11/1987 | Lewis | |
| 4,794,835 A | 1/1989 | Fujiyoshi | |
| 4,854,295 A | 8/1989 | Sakarcan | |
| 4,867,025 A * | 9/1989 | Eklof et al. | 83/835 |
| 5,082,070 A | 1/1992 | Obermeier et al. | |
| 5,127,197 A | 7/1992 | Brukvoort et al. | |
| 5,142,946 A * | 9/1992 | Fappas et al. | 76/37 |
| 5,182,976 A | 2/1993 | Wittkopp | |
| 5,184,597 A * | 2/1993 | Chiuminatta et al. | 125/15 |
| 5,235,753 A | 8/1993 | Stumpf | |
| D342,270 S | 12/1993 | Kwang | |
| 5,309,962 A * | 5/1994 | McCord et al. | 144/237 |
| 5,351,595 A | 10/1994 | Johnston | |
| 5,385,591 A | 1/1995 | Ramanath et al. | |
| 5,438,900 A | 8/1995 | Sundstrom | |
| 5,471,970 A | 12/1995 | Sakarcan | |
| 5,505,750 A | 4/1996 | Andrews | |
| 5,518,443 A | 5/1996 | Fisher | |
| 5,524,518 A * | 6/1996 | Sundstrom | 83/845 |
| 5,555,788 A | 9/1996 | Gakhar et al. | |
| 5,603,252 A | 2/1997 | Hayden, Sr. | |
| D387,261 S | 12/1997 | Asada | |
| 5,839,423 A * | 11/1998 | Jones et al. | 125/15 |
| 5,865,571 A | 2/1999 | Tankala et al. | |
| 5,868,125 A | 2/1999 | Maoujoud | |
| 5,884,547 A | 3/1999 | Carlsen et al. | |
| 5,891,206 A | 4/1999 | Ellingson | |
| 5,896,800 A | 4/1999 | Curtsinger et al. | |
| 6,033,295 A | 3/2000 | Fisher et al. | |
| 6,039,641 A | 3/2000 | Sung | |
| 6,065,370 A | 5/2000 | Curtsinger et al. | |
| 6,167,792 B1 | 1/2001 | Korb et al. | |
| 6,193,770 B1 | 2/2001 | Sung | |
| 6,273,082 B1 * | 8/2001 | Tselesin | 125/15 |
| 6,283,845 B1 * | 9/2001 | Fischbacher et al. | 451/542 |
| 6,286,498 B1 | 9/2001 | Sung | |
| D458,948 S | 6/2002 | Chianese et al. | |
| D459,375 S | 6/2002 | Chianese et al. | |
| D459,376 S | 6/2002 | Chianese et al. | |
| 6,408,838 B1 | 6/2002 | Ogata et al. | |
| D459,740 S | 7/2002 | Chianese et al. | |
| 6,427,573 B1 | 8/2002 | Carlsen et al. | |
| 6,458,471 B2 | 10/2002 | Lovato et al. | |
| 6,460,532 B1 * | 10/2002 | Park | 125/13.01 |
| 6,482,244 B2 | 11/2002 | Tselesin | |
| 6,638,152 B1 * | 10/2003 | Kim et al. | 451/541 |
| D485,478 S | 1/2004 | Sakai | |
| 6,681,674 B2 | 1/2004 | Hakansson et al. | |
| 6,688,206 B1 | 2/2004 | Mummenhoff | |
| 6,691,596 B1 | 2/2004 | Singh et al. | |
| 6,729,220 B2 | 5/2004 | Curtsinger et al. | |
| 6,739,227 B2 | 5/2004 | Thompson | |
| 6,817,936 B1 | 11/2004 | Skeem et al. | |
| 6,827,072 B2 | 12/2004 | Schwammle | |
| 6,872,133 B2 | 3/2005 | Lee et al. | |
| 6,878,051 B2 | 4/2005 | Brach | |
| 6,890,250 B1 * | 5/2005 | Kim et al. | 451/541 |
| 6,935,940 B2 | 8/2005 | Skeem et al. | |
| 7,117,863 B1 | 10/2006 | Dassoulas et al. | |
| 7,127,979 B2 * | 10/2006 | Kocher et al. | 83/848 |
| 7,156,010 B2 | 1/2007 | Asada | |
| 7,210,474 B2 | 5/2007 | Gaida et al. | |
| 7,444,914 B2 | 11/2008 | Brach | |
| 7,832,320 B2 * | 11/2010 | Earle et al. | 83/839 |
| 7,879,129 B2 | 2/2011 | Kosters et al. | |
| 7,946,907 B2 | 5/2011 | Heyen | |
| 2002/0040631 A1 * | 4/2002 | Gaydos | 83/875 |
| 2002/0123302 A1 | 9/2002 | Maras et al. | |
| 2002/0124707 A1 * | 9/2002 | Izard | 83/835 |
| 2003/0056633 A1 * | 3/2003 | Baron et al. | 83/665 |
| 2003/0061920 A1 | 4/2003 | Thompson | |
| 2003/0213483 A1 | 11/2003 | Sakarcan | |
| 2004/0050233 A1 | 3/2004 | Humenberger et al. | |
| 2004/0149114 A1 | 8/2004 | Brach | |
| 2005/0235798 A1 * | 10/2005 | Weber et al. | 83/835 |
| 2005/0279533 A1 | 12/2005 | Corica | |
| 2006/0107815 A1 * | 5/2006 | Asada | 83/835 |
| 2006/0185492 A1 | 8/2006 | Chianese | |
| 2006/0236838 A1 | 10/2006 | Heyen | |
| 2006/0266176 A1 | 11/2006 | Brach | |
| 2006/0283436 A1 | 12/2006 | Dassoulas et al. | |
| 2007/0261530 A1 * | 11/2007 | Earle et al. | 83/835 |
| 2008/0153402 A1 | 6/2008 | Arcona et al. | |
| 2009/0199692 A1 | 8/2009 | Heyen | |
| 2009/0199693 A1 * | 8/2009 | Heyen | 83/835 |
| 2010/0018377 A1 * | 1/2010 | Baron | 83/835 |
| 2010/0035530 A1 | 2/2010 | Gosamo et al. | |
| 2010/0200304 A1 | 8/2010 | Gosamo et al. | |
| 2010/0248600 A1 | 9/2010 | Chianese et al. | |
| 2010/0279138 A1 | 11/2010 | Zheng | |
| 2011/0023911 A1 | 2/2011 | Lenkeit et al. | |

FOREIGN PATENT DOCUMENTS

| | | |
|---|---|---|
| EP | 0871562 B1 | 1/2003 |
| GB | 2086822 | 5/1982 |
| GB | 2086823 A | 5/1982 |
| GB | 2086824 | 5/1982 |
| JP | 51-121880 | 10/1976 |
| JP | 60-109902 | 7/1985 |
| JP | 4-63682 A | 2/1992 |
| JP | 6-226638 A | 8/1994 |
| JP | 8-047816 A | 2/1996 |
| JP | 2003-527975 A | 9/2003 |
| KR | 10-0263787 | 5/2000 |
| WO | 00/43179 A1 | 7/2000 |
| WO | 00/51789 A1 | 9/2000 |
| WO | 01/70471 A1 | 9/2001 |
| WO | 2010/016959 | 2/2010 |
| WO | 2010/118440 | 10/2010 |
| WO | 2011/029106 | 3/2011 |

OTHER PUBLICATIONS

International Preliminary Report on Patentability dated Jul. 27, 2010, from counterpart International Application No. PCT/US2009/031544, filed on Jan. 21, 2009.
Norton, "Silencio" Clipper, 2009, pp. 26-27.
Norton, "Silencio" Clipper, 2010, pp. 28-29.
Norton, Saint-Gobain, "Silencio" Clipper, 2011, pp. 28-29.
Norton, Saint-Gobain, "Silencio" Clipper, 2012, pp. 24-25.
Norton, Saint-Gobain Abrasives, "Technical and Sales Argumentation" 2008, 12 pages.
Norton, Saint-Gobain Abrasives S.A., "Silencio" EN13236, 2011, 2 pages.
Norton, Saint-Gobain Abrasives, "Silencio—Product Sheet", 2009, 1 page.
U.S. Appl. No. 11/110,525, filed Apr. 20, 2005, Inventors: André R. G. Heyen.
U.S. Appl. No. 12/356,772, filed Jan. 21, 2009, Inventors: André R. G. Heyen.
International Search Report for PCT/US2009/031548 dated Apr. 30, 2009, 10 pgs.
International Search Report for PCT/US2006/010071 dated Nov. 11, 2006, 3 pgs.
Garlicki, A.M., "Control of Gullet Cracking in Band Saw Blades," National Research Council in Canada, 1980, pp. 25-29.

* cited by examiner

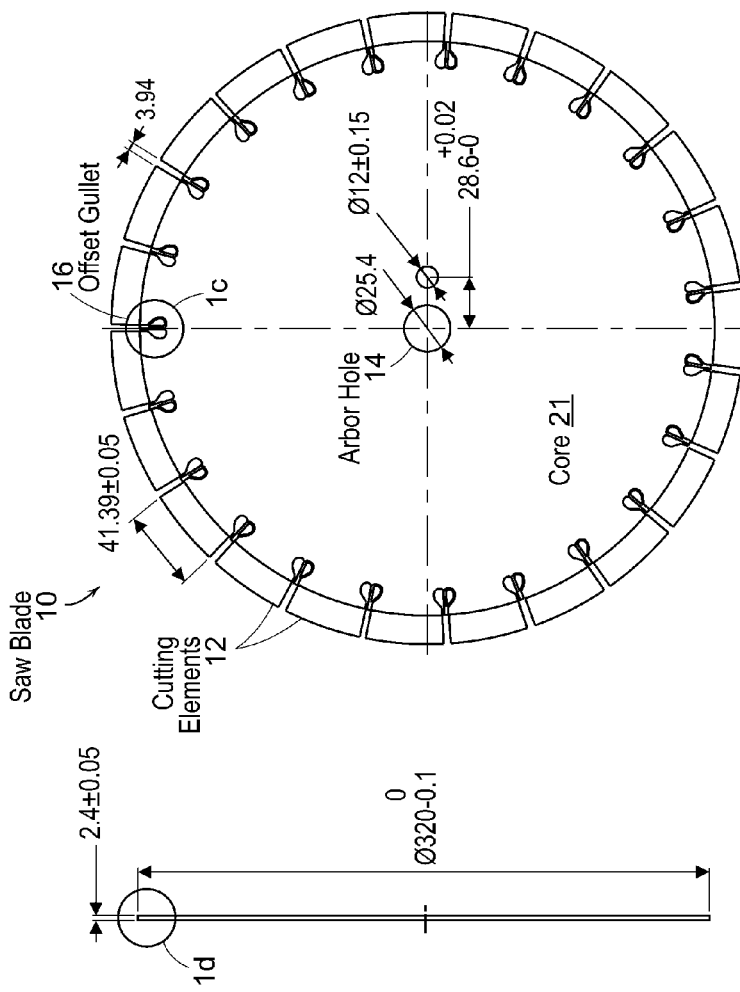
FIG. 1a
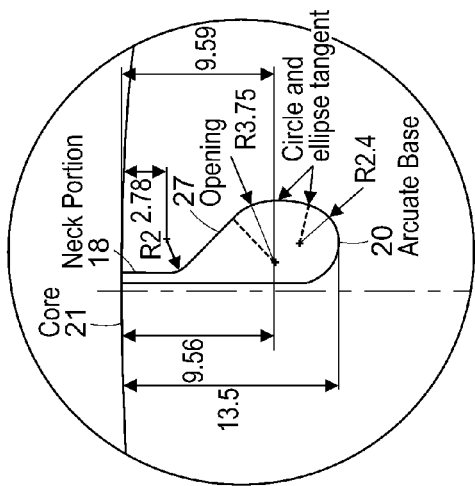
FIG. 1d
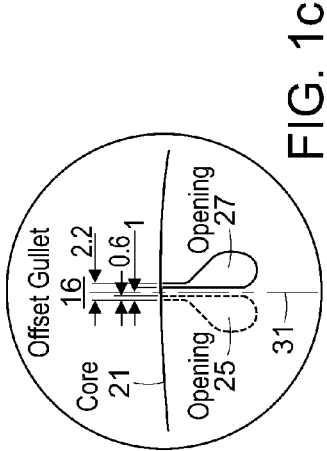
FIG. 1c
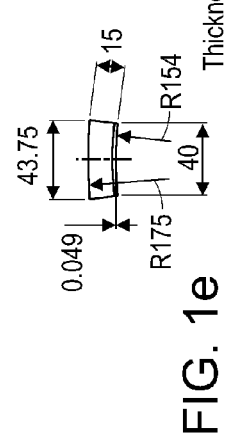
FIG. 1b
FIG. 1e

CIRCULAR SAW BLADE WITH OFFSET GULLETS

RELATED APPLICATIONS

This application claims the benefit under 35 USC 119(e) of U.S. Provisional Application No. 61/011,805, filed on Jan. 22, 2008, which is incorporated herein by reference in its entirety.

FIELD OF THE INVENTION

The invention relates to saw blades, and more particularly, to circular saw blades having gullets designed to reduce fatigue and increase the life of the blade.

BACKGROUND OF THE INVENTION

Conventional circular saw blades typically include a circular steel core having a series of cutters or teeth spaced along its perimeter. Gullets, in the form of cutouts extending inwardly from the periphery of the blade, are often interspaced between the cutters to aid cutting, by relieving stresses in the blade and removing swarf. A variety of gullet configurations may be used. The actual gullet configuration employed for a particular blade is based on the cutting application(s) for which the blade is expected to be used.

Saw blades having relatively narrow gullets have been found useful in sawing of construction material with portable power saws, and in other masonry cutting applications on stationary machines, where smooth cutting action is desired. It has been found that the smoothness of cutting action is enhanced when the cutters are placed relatively close to one another, such as provided by the use of relatively narrow gullets. However, cracks tend to propagate from the tightly radiused ends of these gullets, particularly if the blade is exposed to high radial pressure. This problem is exacerbated on blades in which a fatigue barrier has been surpassed. Alternatively, saw blades having relatively wide gullets may be used. These gullets typically have a relatively large radius at their inner ends, which have been found to provide the blade with relatively high fatigue strength. These gullets may thus be beneficial in relatively high-stress cutting environments, such as floor sawing of asphalt or concrete, in which other blade types tend to fail due to stress cracks propagating from the gullets.

Keyhole-shaped gullets attempt to combine benefits of both narrow and wide gullets. These gullets enable the cutters of a blade to be positioned relatively close to one another (e.g., so as to provide a smooth cutting action) while also providing each gullet with a relatively large radius at its radially inner end (e.g., so as to help reduce crack formation). While keyhole gullets may exhibit improved characteristics over the narrow and wide gullets in some applications, they are not without drawbacks. For example, results achieved with keyhole gullets have been less than optimal in applications involving difficult to cut materials such as steel or a relatively heterogeneous mix of workpiece materials, such as steel reinforced concrete. Under these conditions, cracks have been found to propagate from the ends or sides of the gullets, which may compromise user safety and saw performance.

There is a need, therefore, for improved gullets suitable for circular saw blades.

SUMMARY OF THE INVENTION

One embodiment of the present invention provides a circular saw blade. The saw blade includes a circular core having a first planar side and a second planar side, a central arbor hole, and an outer perimeter. A plurality of cutting elements is at the outer perimeter of the core. In addition, there are one or more offset gullets extending radially inward from the perimeter of the core. Each offset gullet includes a first opening in the first planar side of the core and a second opening in the second planar side of the core. The first and second openings are adjacent but at least partially offset from one another, so that at least a portion of the offset gullet is not see-through (i.e., at least a portion of the first and second openings do not overlap with each other). In one such embodiment, there is no overlap between the first and second openings, such that no portion of the offset gullet is see-through. The first and second openings may be oriented, for example, in a symmetrical fashion, such that at least a portion of the first opening is a mirror image of a portion of the second opening (such symmetry, however, is not required). In one particular example, the core is a sandwich-type core that further includes a middle layer of sound-damping material (e.g., at least one of cork, epoxy, glue, resin, copper, and soft iron) between the first and second planar sides. The first and second planar sides can be, for example, discrete pieces that are operatively coupled together (e.g., via at least one of a suitable bond material and a mechanical fastener) to form the core. The core can be made, for example, of steel and/or non-metallic material. The cutting elements may include, for instance, bonded abrasive segments, a single layer of abrasives, and/or teeth. In one particular configuration, there is at least one offset gullet between neighboring cutting elements. In another particular configuration, each offset gullet includes elliptical qualities in its shape.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 1a and 1b illustrate a circular saw blade configured with offset gullets, in accordance with an embodiment of the present invention.

FIGS. 1c and 1d illustrate details associated with the offset gullets shown in FIG. 1a, in accordance with an embodiment of the present invention.

FIG. 1e illustrates details associated with the abrasive segments shown in FIG. 1a, in accordance with an embodiment of the present invention.

DETAILED DESCRIPTION OF THE PREFERRED EMBODIMENTS

Figure 2A:
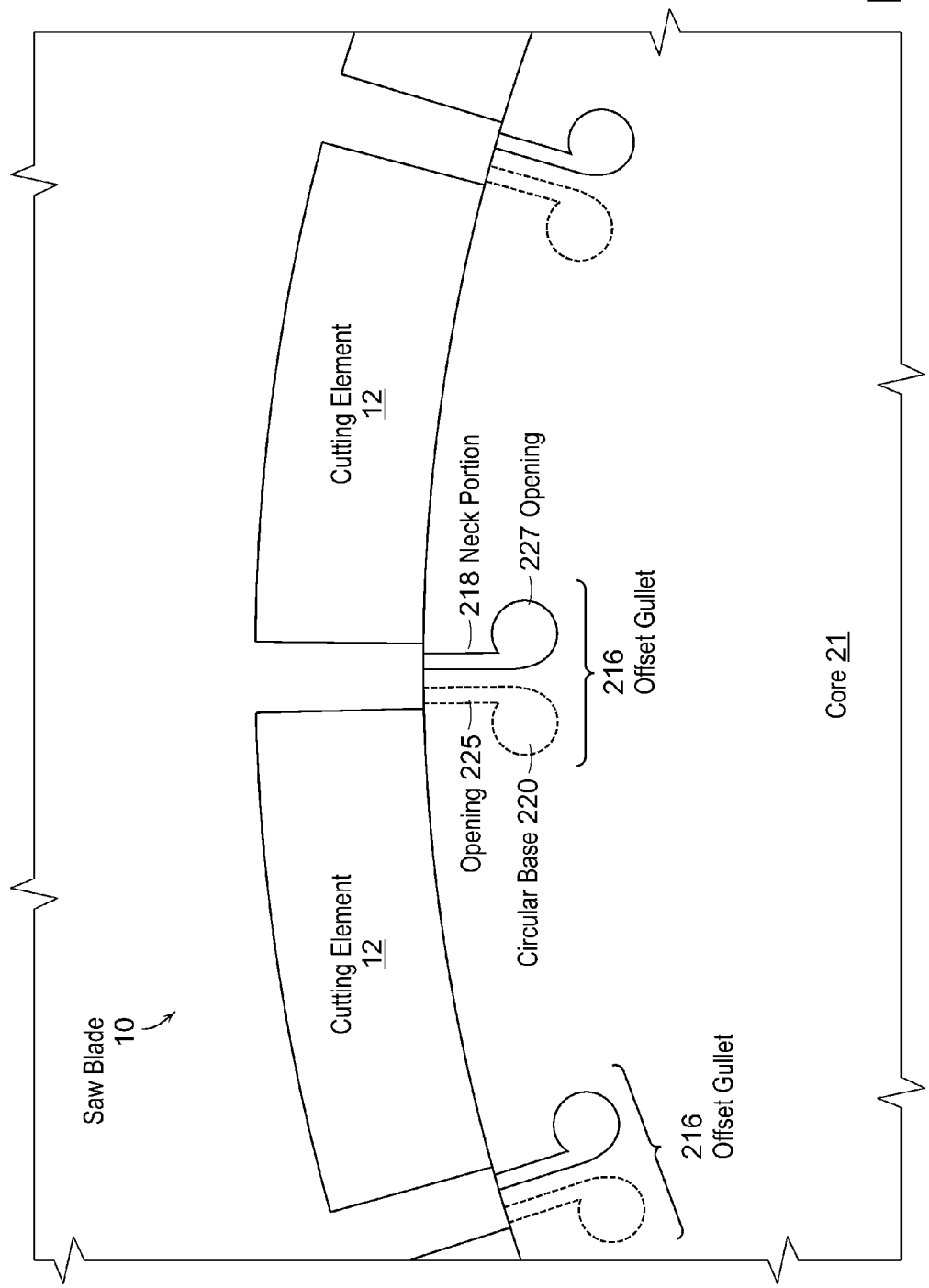
FIGS. 2a, 2b and 2c each illustrate a perspective view of a circular saw blade configured with offset gullets, in accordance with an embodiment of the present invention.

An improved gullet for circular saw blades is disclosed. The gullet can be configured with essentially any suitable shapes (e.g., narrow, wide, keyhole, alphanumeric, and graphical designs), depending on the saw blade application.

The gullet includes opposing openings (in each side of blade) that are offset from one another so as to not overlap or only partially overlap, and is crack-resistant and substantially reduces whistle-noise typical of conventional gullet designs.

General Overview

Conventional sandwich-type saw blades typically include two outer steel layers and a middle or 'sandwiched' layer of a different, more elastic material (e.g., cork, epoxy, glue, resin, copper, or soft iron). The aim of this sandwich-type blade is to reduce noise while in operation. As previously discussed, existing blades, including sandwich-type blades, have gullets in the form of cutouts extending inwardly from the periphery of the blade. These gullets are often interspaced between the cutters, and aid cutting and relieve stresses during cutting operation, as well as during the manufacturing process. On conventional sandwich-type blades, the gullets on both external steel cores are fully aligned. Such a design maximizes the land length and allows max airflow to pass through the gullets when the blade is in use.

In contrast, embodiments of the present invention employ offset gullets. Each offset gullet includes an opening in one side of the blade that is offset from a corresponding opening on the other side of the blade. In this way, there is no see-through gullet opening in the blade, or alternatively, there is only a partially see-through gullet opening in the blade (where a limited portion of the offset gullet openings overlap). In addition, the gullet openings can be close enough so as to allow a sufficient land length for the cutters. Thus, there is reduced airflow through the gullets while the blade is turning, or no airflow at all (depending on whether there is a partial overlap of gullet openings). This airflow on blades having fully see-through conventional gullets causes a whistle noise when cutting and even at idling speeds. The whistle is high frequency noise and unpleasant to the human ear. The offset gullet as described herein can be used to substantially reduce or otherwise totally cancel such noise. In addition, as the see-through gullet hole in the blade is eliminated or otherwise diminished, the rigidity of the blade is increased in the gullet areas. This increased rigidity in turn helps to avoid crack starts and prolongs blade life.

As previously noted, the offset gullet is not linked to any particular gullet shape. Rather, all gullet shapes and designs could be used, so long as the land's length is enough to place the cutters as desired. In addition, the offset gullet can be used with sandwich-type blades (e.g., two outer layers and a middle layer), or any other blade designs that would allow for offset gullet openings. For instance, the blade design may include two discrete outer layers coupled directly together (no middle layer), or two outer layers of a single monolithic core. The cutting elements of the saw blade may be implemented with teeth (such as for cutting wood or plastic) or abrasive segments (such as for cutting masonry or other very hard materials).

Saw Blade and Gullet Examples

FIGS. 1a through 1d illustrate a circular saw blade configured with offset gullets, in accordance with an embodiment of the present invention. As can be seen, the circular saw blade 10 has peripheral cutting elements 12 separated by a series of offset gullets 16.

In the embodiment shown, blade 10 includes a core 21, having an arbor hole 14 through which the blade 10 may be mounted and fastened to the spindle of a circular saw or other suitable machine as conventionally done (e.g., with a threaded fastener). In some embodiments, the blade 10 may further include a bushing such as described in U.S. Patent Application Publication No. 2006/0185492, and/or an assembly for accommodating multiple bore sizes such as described in U.S. Patent Application Publication No. 2006/0266176. Each of these patent applications is herein incorporated by reference in its entirety.

Saw blades configured in accordance with embodiments of the present invention can be used in any number of applications. For instance, saw blade 10 can be installed on a gasoline powered handheld saw (e.g., STIHL TS760, manufactured by Andreas Stihl AG), and used to dry cut a steel plate. Likewise, saw blade 10 can be installed onto a floor saw (e.g., Clipper CSB1 P13, manufactured by Saint-Gobain SA), and used to wet cut concrete. Likewise, saw blade 10 can be installed onto an automatic, 14 HP (10.3 kW) cut-off sawing machine (e.g., HUARD 30V53, manufactured by HUARD), and used to cut a steel or plastic tube. Numerous suitable machines and applications will be apparent in light of this disclosure.

As shown, the core 21 is substantially circular in shape. In one example embodiment, the core includes two discrete outer layers that are mechanically fastened directly to one another (e.g., via welds, rivets, and/or nut-and-bolt arrangement). Alternatively, the core 21 may be a sandwich-type core, where two discrete outer layers sandwich an inner layer of noise-damping material such as cork, glue, epoxy or other suitable damping material (e.g., resin, copper, and soft iron). Alternatively, the core 21 may be integrally formed through a suitable metrology or molding process (e.g., metal casting, injection molding, hot-pressing, cold-pressing, etc), so long as the offset gullets 16 can be provided (e.g., in situ via pressure molding, machined, or otherwise formed). The outer layers of core 21, whether they are discrete or integral in nature, may be fabricated from substantially any material having sufficient strength for the cutting application or applications at hand. Examples of suitable materials include steel, aluminum, titanium, bronze, their composites and alloys, and combinations thereof (e.g., ANSI 4130 steel and aluminum alloys, 2024, 6065 and 7178). Alternatively, for some applications, reinforced plastics or non-metallic composites may be used to construct the core 21.

The core 21 may have other features, in addition to cutting elements 12 and offset gullets 16. For example, and in one particular embodiment, the core 21 includes one or more perforations extending through the central core area, along a circumference disposed concentrically with, and between, the arbor hole 14 and the periphery of blade 10. The perforations are arranged to form an annular window through the core 21 that corresponds to a predetermined cutting depth during rotational operation of the blade 10. Additional details of circular saw blades having one or more cutting depth gauges are provided, for example, in U.S. Pat. No. 7,210,474, which is herein incorporated by reference in its entirety. Other functional features, such as for balancing the blade, indicating source of the blade, reducing operating noise of the blade, and indicating proper mounting of the blade, can also be employed.

As best shown in FIGS. 1c and 1d, each gullet 16 of this example embodiment includes two teardrop-shaped openings (shown as openings 25 and 27 in FIG. 1c). In particular opening 25 is on one side of the core 21 and opening 27 is on the other side of core 21. The two openings 25 and 27 are offset from one another and oriented about a plane 31 (imaginary, shown by dashed line in FIG. 1c) that separates them in a symmetrical fashion, such that opening 25 is the mirror image of opening 27. Each opening 25 and 27 of gullet 16 includes a neck portion 18 defined by parallel side walls extending radially inward from the periphery of the circular blade. At the radially inward end of the neck portion 18, one of the side walls diverges (at about 45°) from the other and then forms into an arcuate base 20. As shown, the base 20 includes elliptical qualities in its shape (at sides and/or bottom), which have been selected to further improve crack-resistance. Note, however, that the offset gullets 16 as described herein can be used with any suitable design (shape, pattern, etc) as previously explained, and the present invention is not intended to be limited to any particular design or shape or set of shapes. Further note that, in alternative embodiments, openings 25 and 27 may partially overlap. The degree of overlap between the openings 25 and 27 can vary, and in some such embodiments, ranges from 1% to 75% (e.g., where 25% or more of opening 25 does not overlap with the opening 27). The degree of overlap between the openings 25 and 27 can be higher (e.g., approaching 99%), with such higher degrees of overlap leading to higher degrees of operational noise. As will be apparent, the discussion relevant to the openings 25 and 27 being oriented in a symmetrical fashion, such that opening 25 is a mirror image of opening 27, can be equally applied to such partially offset gullet designs. In such cases, the mirror images will generally correspond to the non-overlapping portions of the openings 25 and 27.

In this example embodiment, the cutting elements 12 take the form of abrasive-laden segments spaced along the periphery or the core 21. FIG. 1e shows additional dimensional details associated with these example segments. The segments may include, for example, superabrasive grains suspended in a metal bond that is brazed or otherwise secured to the periphery or the core 21. For instance, a superabrasive tool may be manufactured by mixing superabrasive particles such as diamond and cubic boron nitride (cBN) with a suitable metal bond such as iron, copper, and tin. The mixture is then compressed in a mold to form the desired shape (e.g., segment having the desired width, length, and curvature). The 'green' form is then sintered at a suitable temperature to form a bonded segment with a plurality of superabrasive particles disposed therein. The segment is attached (e.g., by brazing, electroplating, or laser bonding) to the perimeter of core 21.

Additional details of circular saw blades configured in accordance with embodiments of the present invention and having suitable abrasive segment designs for cutting elements 12 are provided, for example, in U.S. Pat. No. 5,518,443 (abrasive segments with alternating volume percentages of abrasive grain), U.S. Pat. No. 6,033,295 (portion of the abrasive segment is hardened), and U.S. Pat. No. 5,868,125 (crenelated abrasive segments), each of which is herein incorporated by reference in its entirety. In addition, the abrasive segments can be lengthened, in proportion to the blade diameter, to reduce the number of segments, improve fracture/bend resistance, and reduce manufacturing costs. In one such embodiment, the ratio of abrasive segment length to blade diameter is a minimum of 0.2. As previously mentioned, abrasive segments can be used for relatively difficult cutting operations (e.g., for cutting concrete, asphalt, stone, and other hard materials).

Alternatively, saw blade 10 may be provided with cutting elements 12 in the form of teeth, such as typical of a wide range of circular saw blades intended for cutting relatively soft materials such as wood, plastic, and the like. As is known, the teeth may be of any size and shape. In addition, the teeth may be provided with conventional hardened tips, such as fabricated from tungsten carbide, and/or may be provided with the abrasive grain bonded thereto. In one such example embodiment, saw blade 10 is provided with a plurality of teeth having a single layer of abrasive grains chemically bonded to at least a portion of each tooth, as described in U.S. Pat. Nos. 6,817,936 and 6,935,940, each of which is herein incorporated by reference in its entirety.

Alternatively, saw blade 10 may be provided with cutting elements 12 in the form of a single layer of abrasive grain that is brazed, electroplated, or otherwise attached to the periphery of the core 21 (as opposed to attaching bonded segments or providing teeth at the perimeter). Numerous cutting element 12 configurations and materials can be used in embodiments of the present invention, as will be apparent in light of this disclosure. The present invention is not intended to be limited to any particular cutting element configuration or scheme.

Example dimensions (in millimeters, mm) are also shown in FIGS. 1a through 1d. These dimensions are merely provided as one specific example embodiment that can be fabricated. However, it will be readily apparent in light of this disclosure that numerous dimensions, as well as offset gullet configurations can be used to implement a saw blade in accordance with an embodiment of the present invention. The present invention is not intended to be limited to any particular set or range of blade dimensions or configurations. Rather, embodiments of the present invention are intended to cover any saw blade that can be implemented for its intended purpose and configured with offset gullets as described herein.

Figure 2B:
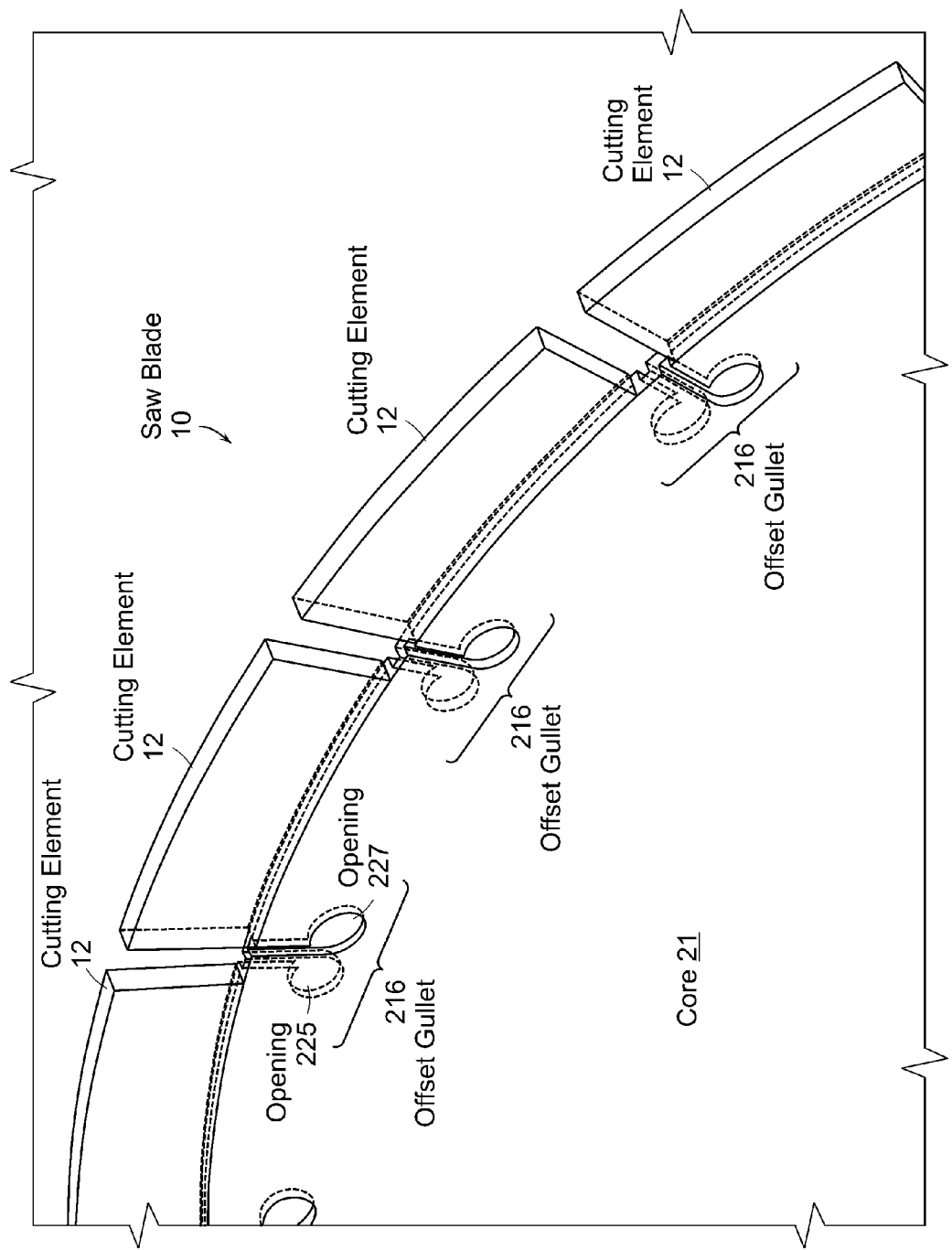
Figure 2C:
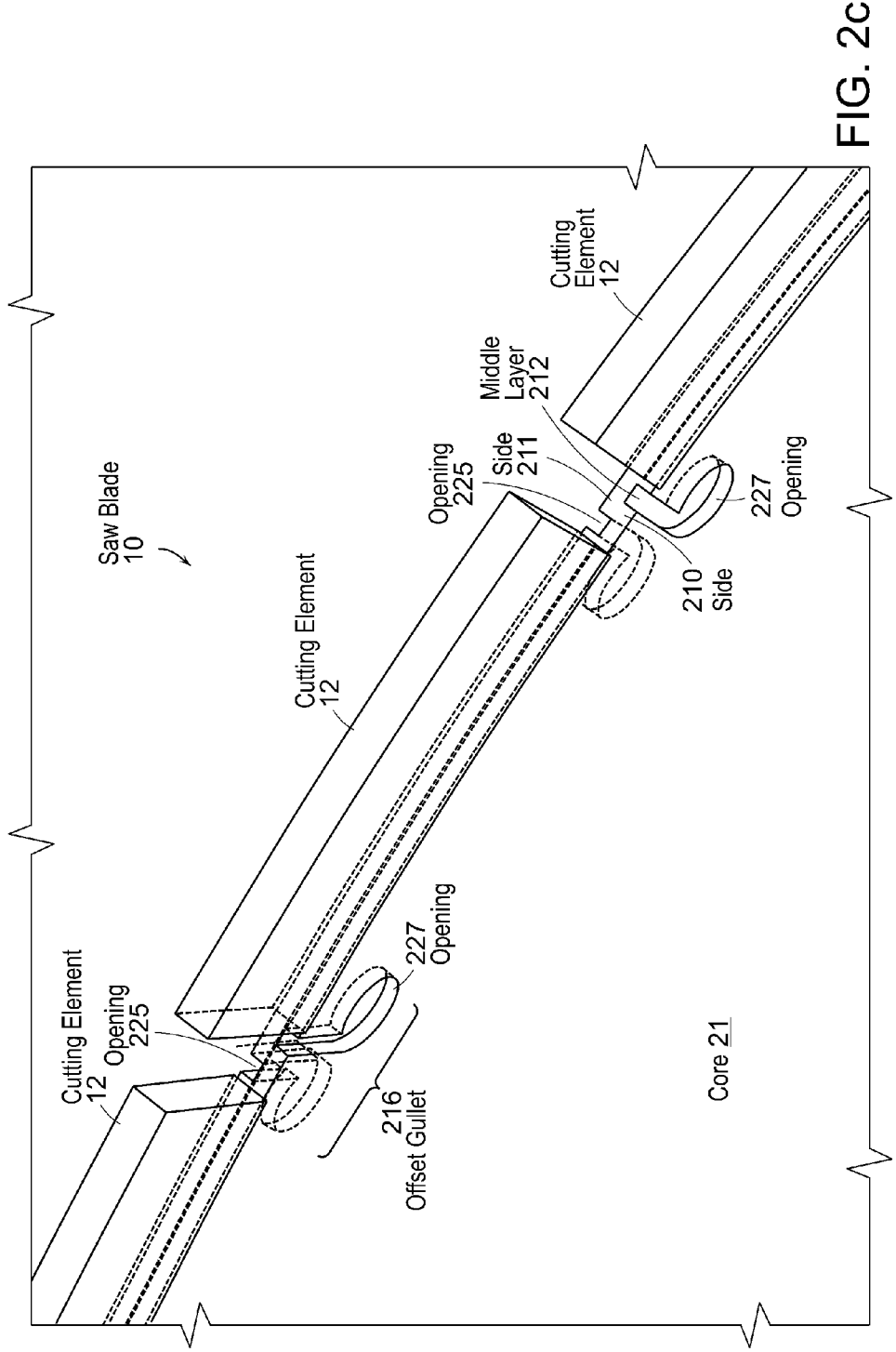

FIGS. 2a, 2b and 2c illustrate a perspective view of offset gullets configured in accordance with another embodiment of the present invention. As can be seen, the circular saw blade 10 has a core 21 with peripheral cutting elements 12 separated by a series of offset gullets 216. The previous discussion with reference to FIGS. 1a through 1d, including discussion relevant to cutting elements 12 and core 21, is equally applicable here, as is the general discussion relevant to offset gullets 16 and saw blade 10. The main difference of the embodiment shown in FIGS. 2a through 2c is the design of offset gullets 216.

In more detail, each offset gullet 216 of this example embodiment includes two musical note shaped openings (shown as openings 225 and 227). In particular, and as best shown by FIG. 2c, opening 225 is on side 211 of the core 21 and opening 227 is on side 210 of core 21. The core 21 in this example is shown as a sandwich-type core and further includes middle layer 212, which is sandwiched between the planar sides 210 and 211. The two openings 225 and 227 are offset from one another and oriented about a plane (imaginary) that separates them in a symmetrical fashion, such that opening 225 is the mirror image of opening 227. Each opening 225 and 227 of gullet 216 includes a neck portion 218 defined by parallel side walls extending radially inward from the periphery of the circular blade. At the radially inward end of neck portion 218, one of the side walls opens into a circular base 220.

Recall that, in alternative embodiments, openings 225 and 227 may partially overlap as previously explained. In addition, other opening designs can be used to implement the offset gullets 216 (e.g., narrow openings having only a neck portion 218, or wide openings having only a 'neck' portion that has a width of the circular base 220, or keyhole openings as shown, or 'J' shaped openings, or question-mark or spiral shaped openings. In one example embodiment, the offset gullets 216 are implemented using openings shaped in the form of alphanumeric, graphical, and/or trademark indicia, as described in U.S. Pat. No. 6,878,051. In another example embodiment, the offset gullets 216 are implemented using arrow-shaped openings that extend radially deeper than straight keyhole openings, and interspersed with the straight keyhole openings, as shown in U.S. Design Patent Nos. 458, 948, 459,375, 459,376, and 459,740. In another example embodiment, the offset gullets 216 are implemented using openings designed to reduce fatigue and cracking, as shown, for instance, in U.S. Patent Application Publication No. 2006/0236838. Each of these patents and applications is herein incorporated by reference in its entirety. In a more general sense, the selection of an opening design for offset gullets 216 for a particular saw blade can generally be based on the cutting application(s) for which that blade is expected to be used.

In addition, note that the openings 225 and 227 are shown to be oriented in a symmetrical fashion, such that opening 225 is the mirror image of opening 227. This symmetrical, mirror image relationship is not required for all embodiments of the present invention. For instance, in alternative embodiments, opening 227 can have one design and opening 225 can have another design, such that there is little or no symmetry and no mirror image quality (e.g., where offset gullet 216 is made up of two different shaped openings proximate and offset from one another, but each on its respective side of core 21). Likewise, openings 225 and 227 can have the same design, but be oriented in the same direction, so as to not provide the mirror image quality (e.g., where each note-shaped opening 225 and 227 faces the same direction). In general, the openings 225 and 227 making up the offset gullets 216 can have any number of shapes and configurations, as desired for a given application.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A circular saw blade, comprising:
    a circular core having a first planar side and a second planar side, a central arbor hole, and an outer perimeter;
    a plurality of cutting elements at the outer perimeter of the core; and
    one or more offset gullets configured to reduce noise and extending radially inward from the perimeter of the core, each offset gullet including a first opening in the first planar side of the core and a second opening in the second planar side of the core;
    wherein the first and second openings are adjacent and entirely offset from one another; and
    wherein the first opening includes a first neck portion between two adjacent cutting elements on the first planar side of the core and the second opening includes a second neck portion between the same two adjacent cutting elements as the first neck portion on the second planar side of the core.

2. The circular saw blade of claim 1 wherein no portion of the offset gullet is see-through.

3. The circular saw blade of claim 1 wherein the first and second openings are oriented in a symmetrical fashion, such that at least a portion of the first opening is a mirror image of a portion of the second opening.

4. The circular saw blade of claim 1 wherein the first and second planar sides are discrete pieces that are operatively coupled together to form the core.

5. The circular saw blade of claim 4 wherein the first and second planar sides are operatively coupled via at least one of a bond material and a mechanical fastener.

6. The circular saw blade of claim 4 wherein the core is a sandwich-type core that further includes a middle layer of sound-damping material bonded between the first and second planar sides.

7. The circular saw blade of claim 6 wherein the sound-damping material includes at least one of cork, epoxy, glue, resin, copper, and soft iron.

8. The circular saw blade of claim 1 wherein the core is made of nonmetallic material.

9. The circular saw blade of claim 1 wherein the core is made of steel.

10. The circular saw blade of claim 1 wherein the cutting elements include one of bonded abrasive segments, a single layer of abrasives, or teeth.

11. The circular saw blade of claim 1 wherein there is at least one offset gullet between neighboring cutting elements.

12. The circular saw blade of claim 1 wherein each offset gullet includes elliptical qualities in its shape.

13. A circular saw blade, comprising:
    a circular core having a first planar side and a second planar side, a central arbor hole, a middle layer of sound-damping material sandwiched between the first and second planar sides, and an outer perimeter;
    a plurality of cutting elements at the outer perimeter of the core; and
    one or more offset gullets configured to reduce noise and extending radially inward from the perimeter of the core, each offset gullet including a first opening in the first planar side of the core and a second opening in the second planar side of the core;
    wherein the first and second openings are adjacent and entirely offset from one another;
    wherein the first and second openings are oriented in a symmetrical fashion, such that at least a portion of the first opening is a minor image of a portion of the second opening; and
    wherein the first opening includes a first neck portion between two adjacent cutting elements on the first planar side of the core and the second opening includes a second neck portion between the same two adjacent cutting elements as the first neck portion on the second planar side of the core.

14. The circular saw blade of claim 13 wherein no portion of the offset gullet is see-through.

15. The circular saw blade of claim 13 wherein the first and second planar sides are discrete pieces that are operatively coupled together to form the core.

16. The circular saw blade of claim 13 wherein the sound-damping material includes at least one of cork, epoxy, glue, resin, copper, and soft iron.

17. The circular saw blade of claim 13 wherein the cutting elements include one of bonded abrasive segments, a single layer of abrasives; or teeth.

18. A circular saw blade, comprising:
    a circular core having a first planar 'side and a second planar side, a central arbor hole, and an outer perimeter, wherein the first and second planar sides are operatively coupled via at least one of a bond material and a mechanical fastener;
    a plurality of cutting elements at the outer perimeter of the core, wherein the cutting elements include one of bonded abrasive segments, a single layer of abrasives, or teeth; and
    one or more offset gullets configured to reduce noise and extending radially inward from the perimeter of the core, each offset gullet including a first opening in the first planar side of the core and a second opening in the second planar side of the core;
    wherein the first and second openings are adjacent and entirely offset from one another and wherein the first opening includes a first neck portion between two adjacent cutting elements on the first planar side of the core and the second opening includes a second neck portion between the same two adjacent cutting elements as the first neck portion on the second planar side of the core.

19. The circular saw blade of claim 18 wherein no portion of the offset gullet is see-through.

20. The circular saw blade of claim 18 wherein the first and second openings are oriented in a symmetrical fashion, such that at least a portion of the first opening is a mirror image of a portion of the second opening.

* * * * *